US011563553B2

(12) United States Patent
Rahman

(10) Patent No.: US 11,563,553 B2
(45) Date of Patent: Jan. 24, 2023

(54) DYNAMICALLY STEERING DATA TRAFFIC SESSIONS BASED ON TRAFFIC TYPE

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 5 days.

(21) Appl. No.: 17/320,167

(22) Filed: May 13, 2021

(65) Prior Publication Data

US 2022/0368511 A1 Nov. 17, 2022

(51) Int. Cl.
*H04L 5/14* (2006.01)
*H04W 28/02* (2009.01)
*H04W 92/10* (2009.01)

(52) U.S. Cl.
CPC .......... *H04L 5/1469* (2013.01); *H04L 5/1423* (2013.01); *H04W 28/0268* (2013.01); *H04W 92/10* (2013.01)

(58) Field of Classification Search
CPC ............... H04L 5/1469; H04L 5/1423; H04W 28/0268; H04W 92/10
See application file for complete search history.

(56) References Cited

U.S. PATENT DOCUMENTS

| 7,248,567 | B2* | 7/2007 | Desgagne | H04W 72/04 370/478 |
| 10,609,530 | B1* | 3/2020 | Patil | H04L 41/122 |
| 10,841,791 | B1* | 11/2020 | Zhang | H04W 8/245 |
| 11,343,793 | B1* | 5/2022 | John | H04W 76/14 |
| 2002/0105913 | A1* | 8/2002 | Miya | H04W 36/30 370/254 |
| 2002/0173277 | A1* | 11/2002 | Takao | H04W 16/04 455/77 |
| 2004/0264393 | A1* | 12/2004 | Desgagne | H04W 72/04 370/321 |
| 2014/0192685 | A1* | 7/2014 | Mueck | H04W 72/04 370/280 |
| 2016/0249345 | A1* | 8/2016 | Takeda | H04L 5/00 |
| 2017/0310435 | A1* | 10/2017 | Wei | H04L 5/0007 |
| 2018/0098337 | A1* | 4/2018 | Lee | H04W 72/1273 |
| 2019/0045397 | A1* | 2/2019 | Mueck | H04W 88/06 |
| 2020/0037165 | A1* | 1/2020 | Kunz | H04W 12/106 |
| 2020/0137675 | A1* | 4/2020 | Park | H04W 68/005 |
| 2021/0112436 | A1* | 4/2021 | Hoffner | H04L 41/5003 |

(Continued)

*Primary Examiner* — Nathan S Taylor

(57) ABSTRACT

Dynamically steering data traffic sessions based on traffic type may include: determining that both frequency division duplex (FDD) and time division duplex (TDD) are available for an air interface between a user equipment (UE) and a base station (BS); determining a first traffic type expected over the air interface for a first data traffic session; based on at least the first traffic type, determining that FDD is a preferred duplex scheme for the first data traffic session; instructing the UE to use FDD over the air interface for the first data traffic session; determining a second traffic type expected over the air interface for a second data traffic session; based on at least the second traffic type, determining that TDD is a preferred duplex scheme for the second data traffic session; and instructing the UE to use TDD over the air interface for the second data traffic session.

20 Claims, 6 Drawing Sheets

(56) References Cited

U.S. PATENT DOCUMENTS

| | | | | |
|---|---|---|---|---|
| 2021/0409301 | A1* | 12/2021 | Salkintzis | H04L 43/0864 |
| 2022/0182872 | A1* | 6/2022 | John | H04W 76/10 |
| 2022/0287051 | A1* | 9/2022 | Panchai | H04L 49/90 |
| 2022/0303854 | A1* | 9/2022 | Salkintzis | H04W 36/26 |
| 2022/0345887 | A1* | 10/2022 | Karampatsis | H04W 8/18 |

* cited by examiner

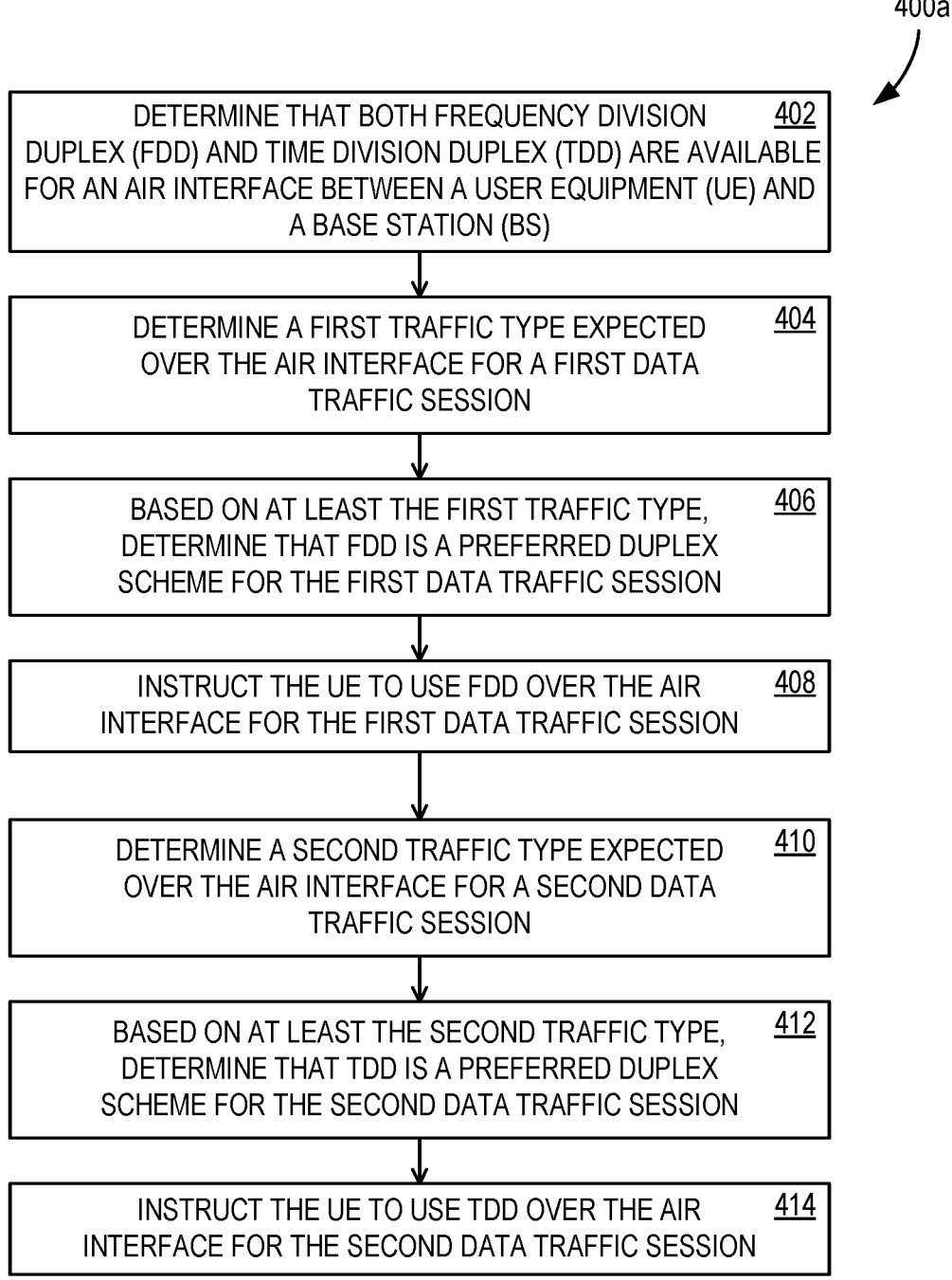

DYNAMICALLY STEERING DATA TRAFFIC SESSIONS BASED ON TRAFFIC TYPE

BACKGROUND

In fifth generation (5G) and fourth generation (4G) cellular networks, multiple frequency bands are allocated for wireless communication (e.g., over an air interface) between a user equipment (UE) and a cellular base station (BS). These may include 600 megahertz (MHz), 700 MHz, 850 MHz, 1.7/2.1 GHz, 1.9 GHz, 2.3 GHz, 2.5 GHz, 2.8 GHz, 3.9 GHz, 5.2 GHz frequency bands. Wireless transmissions from the UE to the BS are uplink transmissions, and wireless transmissions from the BS to the UE are downlink transmissions. The 2-way traffic between the UE and BS requires duplexing, so that both endpoints may both transmit to and receive from the other.

The two common duplexing schemes are frequency division duplex (FDD) and time division duplex (TDD). FDD uses one frequency for the uplink and a different frequency for the downlink, so that both may transmit simultaneously. In contrast, TDD uses the same frequency for both the uplink and the downlink. To avoid conflicts in which both the UE and BS transmit at the same time, transmissions by the UE and the BS are scheduled in a manner that only one transmits at a time. Thus, with TDD, transmissions may not be continuous, but may instead experience additional latency, such as when data flowing in one direction (uplink or downlink) is held in a buffer, waiting for a scheduled transmission window.

SUMMARY

The following summary is provided to illustrate examples disclosed herein, but is not meant to limit all examples to any particular configuration or sequence of operations.

Dynamically steering data traffic sessions based on traffic type may include: determining that both frequency division duplex (FDD) and time division duplex (TDD) are available for an air interface between a user equipment (UE) and a base station (BS); determining a first traffic type expected over the air interface for a first data traffic session; based on at least the first traffic type, determining that FDD is a preferred duplex scheme for the first data traffic session; instructing the UE to use FDD over the air interface for the first data traffic session; determining a second traffic type expected over the air interface for a second data traffic session; based on at least the second traffic type, determining that TDD is a preferred duplex scheme for the second data traffic session; and instructing the UE to use TDD over the air interface for the second data traffic session.

In some examples, dynamically steering data traffic sessions based on traffic type may include: determining a plurality of available bands available for an air interface between a UE and a BS; determining a first traffic type expected over the air interface for a first data traffic session; based on at least the first traffic type, determining a first preferred band from among the plurality of available bands; determining a second traffic type expected over the air interface for a second data traffic session; based on at least the second traffic type, determining a second preferred band from among the plurality of available bands, wherein the second preferred band is a different band than the first preferred band; and dynamically steering the first data traffic session to the first preferred band over the air interface and the second data traffic session to the second preferred band over the air interface.

BRIEF DESCRIPTION OF THE DRAWINGS

The disclosed examples are described below with reference to the accompanying drawing figures listed below, wherein:

FIG. 4A illustrates another flowchart of exemplary operations associated with wireless communication using the arrangement of FIG. 1;

Figure 1:
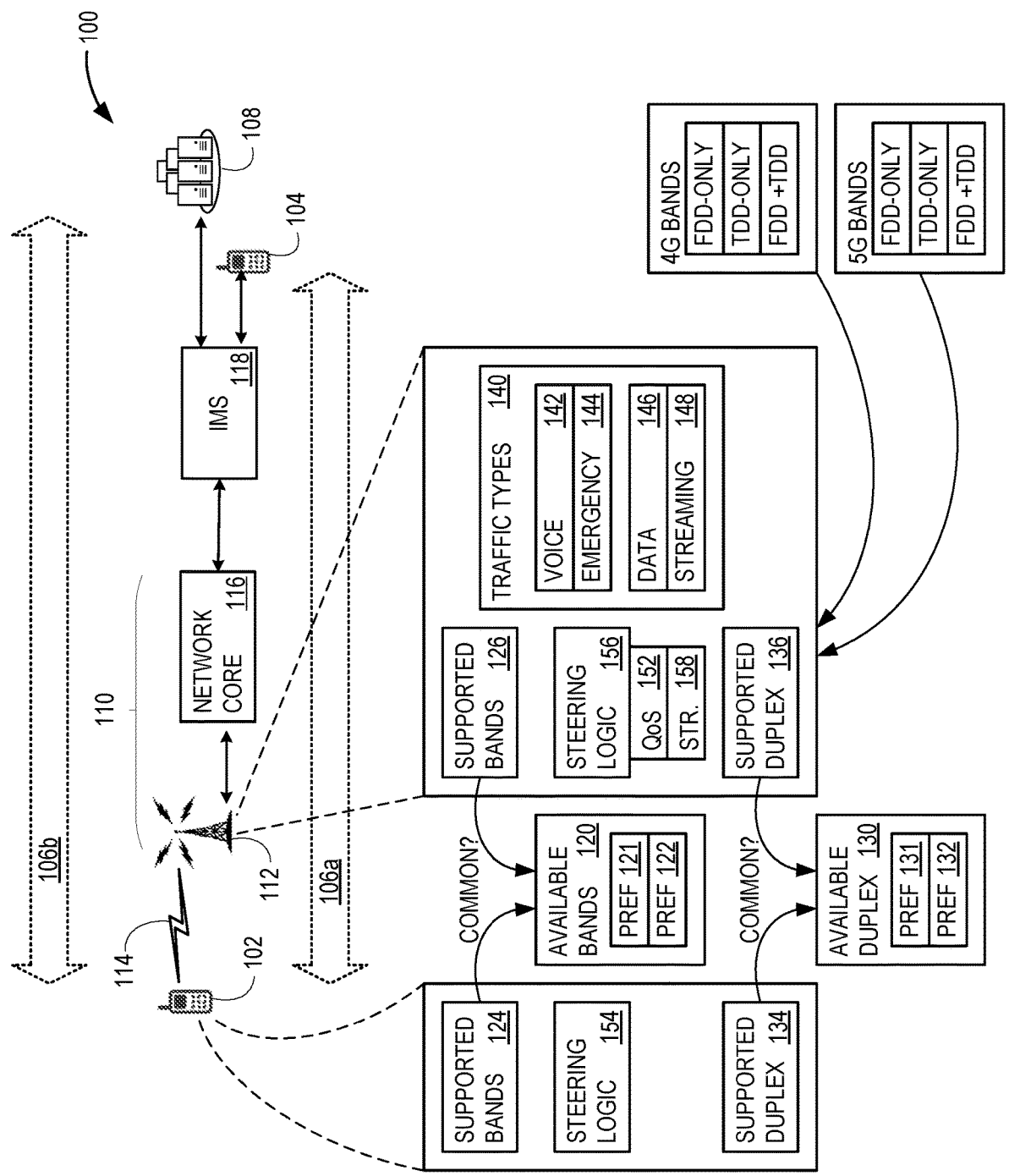
FIG. 1 illustrates an exemplary arrangement that advantageously dynamically steers data traffic sessions to a preferred band and/or a preferred duplex scheme, based on at least a traffic type.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Dynamically steering data traffic sessions based on traffic type may include: determining that both frequency division duplex (FDD) and time division duplex (TDD) are available for an air interface between a user equipment (UE) and a base station (BS); determining a first traffic type expected over the air interface for a first data traffic session; based on at least the first traffic type, determining that FDD is a preferred duplex scheme for the first data traffic session; instructing the UE to use FDD over the air interface for the first data traffic session; determining a second traffic type expected over the air interface for a second data traffic session; based on at least the second traffic type, determining that TDD is a preferred duplex scheme for the second data traffic session; and instructing the UE to use TDD over the air interface for the second data traffic session.

In some examples, dynamically steering data traffic sessions based on traffic type may include: determining a plurality of available bands available for an air interface between a UE and a BS; determining a first traffic type expected over the air interface for a first data traffic session; based on at least the first traffic type, determining a first preferred band from among the plurality of available bands; determining a second traffic type expected over the air interface for a second data traffic session; based on at least the second traffic type, determining a second preferred band from among the plurality of available bands, wherein the second preferred band is a different band than the first preferred band; and dynamically steering the first data traffic session to the first preferred band over the air interface and the second data traffic session to the second preferred band over the air interface.

For some traffic, such as voice calls, the additional latency introduced by TDD (e.g., the device sending data over the air interface waiting for a scheduled transmission window) may degrade user performance. Additionally, data in a voice call may have largely symmetric uplink/downlink burdens, making use of both frequencies. Thus, FDD may be preferable for voice calls, and some other real-time data transmissions. Unfortunately, FDD uses multiple frequencies. TDD may offer superior spectral efficiency, because only a single frequency is used. For some data, which may be easily buffered (e.g., streaming video), the buffering reduces latency issues. Further, if the data flow is dominantly in one direction (e.g., streaming video may have a heavy downlink burden but a light uplink burden), the use of two frequencies may be a less efficient use of spectrum than a single frequency in which the majority of the transmission window scheduling is used for the dominant data flow direction. Thus, TDD may be preferable for data transmissions that may be buffered and is dominantly in a single direction.

Some data transmissions, however, such as reading from and posting to social media may be easily buffered without degrading user experience, and may have more symmetric data flow. In such scenarios, the duplexing scheme may be less of an issue that the propagation characteristics of the selected frequency band. Some frequencies tend to bend around objects or pass through objects better than other frequencies, and some frequencies may support wider bandwidths. Thus, in some scenarios, data traffic type may drive selection of a preferred band based on propagation differences, instead of (or in addition to) preference for a duplex scheme.

Aspects of the disclosure improve the quality and efficiency of wireless communication by determining a preferred duplex scheme and/or band and dynamically steering a data traffic session to the preferred duplex scheme and/or band over the air interface. For example, aspects of the disclosure improve the quality of wireless communication by steering voice calls to FDD for voice calls and improve the efficiency of wireless communication by steering streaming video to TDD. The steering is dynamic because it may change the band and/or duplex scheme for a new data traffic session, which may be different than the band and/or duplex scheme currently in use by the UE.

With reference now to the figures, FIG. 1 illustrates an arrangement 100 that advantageously dynamically steers each of data traffic session 106a and 106b s to a preferred band and/or a preferred duplex scheme, based on at least the traffic type. In the illustrated example, data traffic session 106a is a voice call and data traffic session 106b is a streaming video session. Voice calls may be further differentiated into regular voice calls and emergency voice calls. Streaming video falls under a generic data session category, along with reading from and posting to social media.

For data traffic session 106a, a voice call originates with a UE 102 and passes through a network 110 and an internet protocol (IP) multimedia subsystem (IMS) 118 to another UE 104. Voice calls between UEs 102 and 104 may also originate with UE 104. For data traffic session 106b, UE 102 connects to a network resource 108 to receive streaming video through IMS 118 and network 110. Network 110 may be a fifth generation (5G) cellular network, a fourth generation (4G) cellular network, a blend of 5G and 4G, or another type of network. Network 110 comprises at least a base station (BS) 112, which communicates with UE 102 over an air interface 114, and a network core 116.

4G and 5G bands include 600 MHz, 700 MHz, 850 MHz, 1.7/2.1 GHz, 1.9 GHz, 2.3 GHz, 2.5 GHz, 2.8 GHz, 3.9 GHz, 5.2 GHz frequency bands. Some are FDD only, some are TDD only, and some permit both FDD and TDD. For example, the FDD n66 band uses an uplink channel in the frequency range of 1710-1780 megahertz (MHz) and a downlink channel in the frequency range of 2110-2200 MHz, providing 400 MHz duplex spacing. The TDD n41 band uses a single channel in the frequency range of 2496-2690 MHz. The "n" preceding the band number indicates "new radio" (NR), which is another term used for 5G. cellular channels around 1900 MHz may be TDD in 4G and FDD in 5G. The allocation of certain frequencies to only FDD or only TDD is defined in industry standards, but may be changed for future cellular technology generations.

UE 102 is unlikely to support all possible 4G and 5G bands, but is instead likely configured with a limited set of supported bands 124 that then drives the supported duplex schemes 134 that correspond (according to the industry standards) with specific ones of supported bands 124. Similarly, BS 112 is unlikely to support all possible 4G and 5G bands, but is instead likely configured with a limited set of supported bands 126 that then drives the supported duplex schemes 136 that correspond (according to the industry standards) with specific ones of supported bands 126. For example, different countries use different bands, and different cellular carriers in each country may use different bands.

Where there is overlap (commonality) between the set of bands supported by UE 102 (supported bands 124) and the set of bands supported by BS 112 (supported bands 126), the common set becomes available bands 120, which may have a plurality of bands. Available bands 120 is thus a plurality of available bands available for air interface 114 between UE 102 and BS 112. Similarly, where there is overlap (commonality) between supported duplex schemes 134 of UE 102 and supported duplex schemes 136 of BS 112, the common set becomes available duplex schemes 130, which may include both FDD and TDD.

A preferred band 121 is the preferred band for data traffic session 106a, because of the voice call data type, and a preferred band 122 is the preferred band for data traffic session 106b, because of the streaming video data type. Similarly, a preferred duplex scheme 131 is the preferred duplex scheme for data traffic session 106a, because of the voice call data type, and a preferred duplex scheme 132 is the preferred duplex scheme for data traffic session 106b, because of the streaming video data type. A list of traffic types 140 includes a voice type 142, an emergency voice type 144, a generic data traffic session type 146 (e.g., social media), and a streaming video type 148. Other traffic types may also be defined. List of traffic types 140 includes an indication of a preferred duplex scheme and/or a preferred band for the various traffic types, or may instead include a set of rules enabling the determination of a preferred duplex scheme and/or a preferred band for the various traffic types.

BS 112 includes a steering logic 156 that determines preferred band 121 and/or preferred duplex scheme 131 for data traffic session 106a, preferred band 122 and/or preferred duplex scheme 132 for data traffic session 106a, and a preferred band and/or preferred duplex scheme for other data traffic sessions. In some examples, steering logic 156 uses a quality of service (QoS) flag 152 that is associated with a traffic type, in order to select a preferred band and/or a preferred duplex scheme. In some examples, QoS flag 152 is identified in list of traffic types 140, or is indicated in a session initiation protocol (SIP) message that is used to establish the data traffic session. A steering logic 154 in UE 102 assists with determining preferred bands and duplex schemes by, for example, alerting BS 112 of an expected traffic type (for a data traffic session that will be initiated by UE 102).

A preference strength 158 is used, in some examples, to indicate how important the preferred band and/or the preferred duplex scheme may be. For example, if BS 112 determines that FDD is the preferred duplex scheme for data traffic session 106a, because data traffic session 106a is voice type 142, preference strength 158 may be set to a moderate level. If BS 112 does not have capacity on a band that supports FDD (e.g., BS 112 only has capacity on a band that supports TDD), the preference for FDD may not be provided for data traffic session 106a, due to the limited value of preference strength 158. However, for a data traffic session having an emergency voice type 144, preference strength 158 may be set to a high value. In such a scenario, BS 112 may take measures to make or prioritize capacity on a band that supports FDD, because of the high value of preference strength 158.

Figure 2:
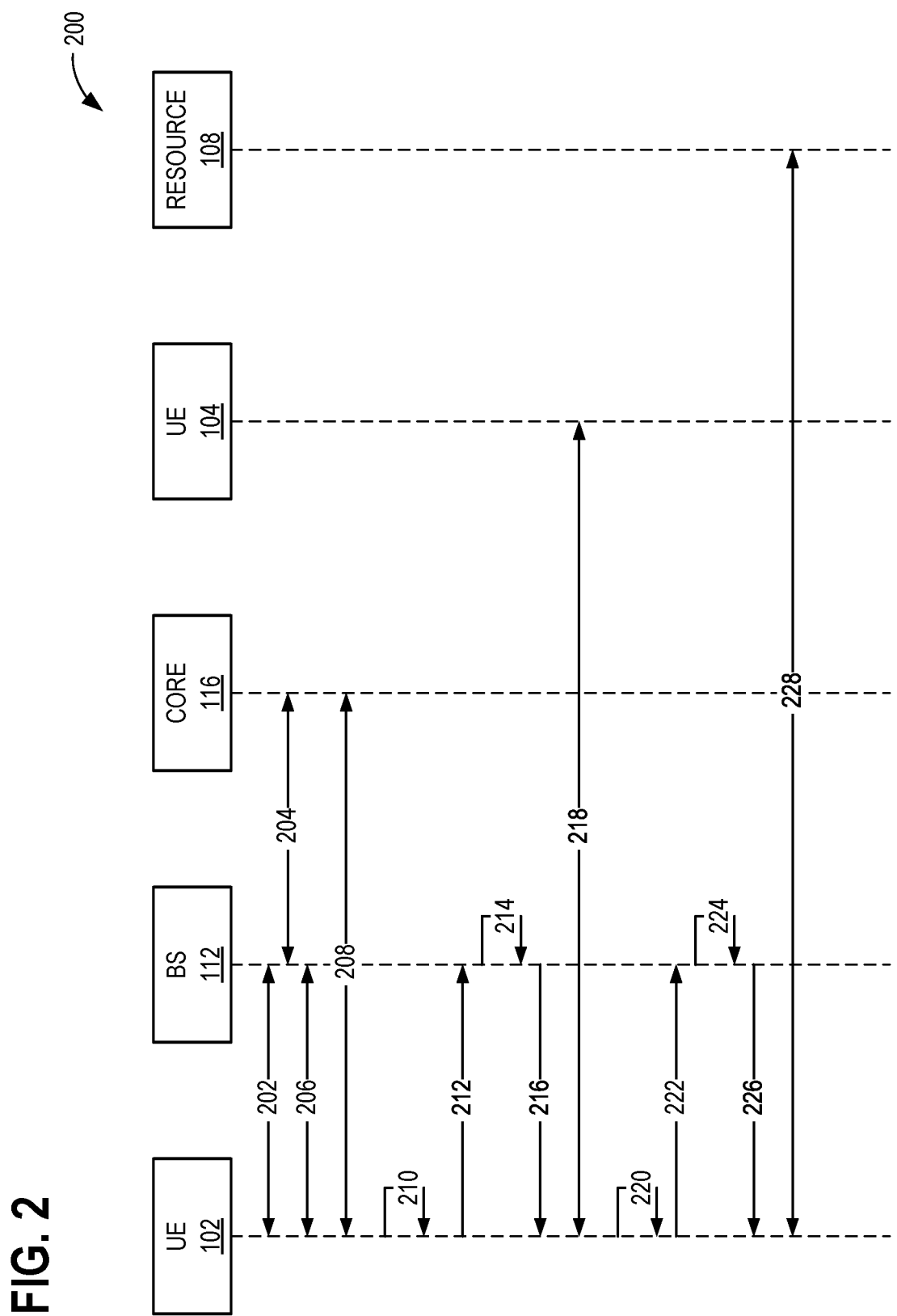
FIG. 2 illustrates an exemplary message sequence diagram associated with dynamically steering data traffic sessions based on traffic type, in the arrangement of FIG. 1.
Figure 3:
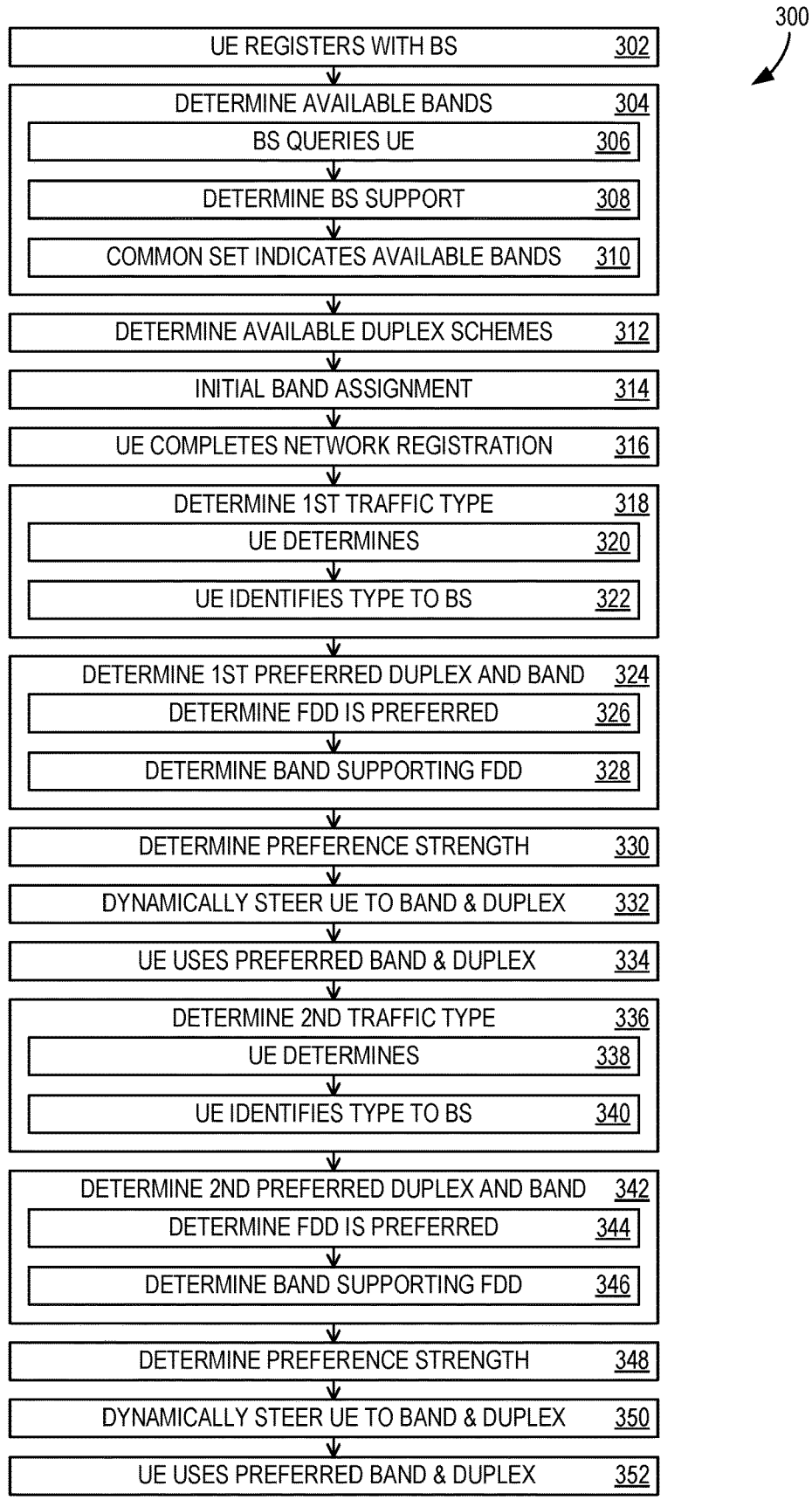
FIG. 3 illustrates a flowchart of exemplary operations associated with wireless communication using the arrangement of FIG. 1.

Further description of arrangement 100 is made with respect to the descriptions of FIGS. 2 and 3. FIG. 2 illustrates a message sequence diagram 200 associated with dynamically steering data traffic sessions based on traffic type, and FIG. 3 illustrates a flowchart 300 of exemplary wireless communication operations associated with dynamically steering data traffic sessions based on traffic type. In some examples, at least a portion of flowchart 300 may be performed using one or more computing devices 500 of FIG. 5. FIGS. 1, 2 and 3 should be viewed together.

UE 102 registers with BS 112 in operation 302, which uses message 202 between UE 102 and BS 112, and also BS 112 verifying with network core 116 that UE 102 is a valid subscriber, with message 204. Operation 304 includes determining available bands 120 (which may include a plurality of available bands) available for air interface 114 between UE 102 and BS 112. In some examples, operation 304 is performed using operations 306-310. Operation 306 includes querying, by BS 112, a set of bands supported by UE 102 (e.g., supported bands 124). This is indicates as message 206, including the response by UE 102. Operation 308 includes determining a set of bands supported by BS 112 (e.g., supported bands 126). Operation 310 includes determining a common set of bands supported by both UE 102 and BS 112, which indicates available bands 120. Operation 312 includes determining that both FDD and TDD are available for air interface 114 between UE 102 and BS 112. In some examples, operation 312 is part of operation 304. BS 112 assigns an initial band to UE 102 in operation 314, using message 206. UE 102 registers with network core 116 in operation 316, using message 208.

UE 102 is then used to initiate a voice call. Operation 318 includes determining the first traffic type expected over air interface 114 for data traffic session 106a. This is voice type 142. In some examples, such as when UE 102 initiates a data traffic session, UE 102 determines the traffic type, as shown in operation 320 and message 210. If UE 102 initiates the data traffic session, UE 102 may identify the traffic type to BS 112, as shown in operation 322, using message 212. Otherwise, for an incoming data traffic session (e.g., a voice call initiated by other UE 104), BS 112 may determine the traffic type expected over air interface 114 for the data traffic session.

Operation 324 (also indicated as message 214) includes, based on at least the first traffic type, determining a preferred duplex scheme (e.g., preferred duplex scheme 131) and a preferred band (e.g., preferred band 121). In some examples, this is a single determination. In some examples, operation 324 is performed using operations 326 and 328. Operation 326 includes, based on at least the first traffic type, determining that FDD is the preferred duplex scheme for the first data traffic session, and operation 328 includes, based on at least the first traffic type, determining the first preferred band from among the plurality of available bands (e.g., available bands 120). The determination may be split into two parts (duplex scheme and band) when multiple bands are available for the same duplex scheme, and some of those bands have preferable propagation or noise/interference characteristics. In some examples, determining the first preferred band based on at least the first traffic type comprises determining that FDD is the preferred duplex scheme for the first traffic type. In some examples, determining the first preferred band comprises determining, by BS 112, QoS flag 152 associated with the first traffic type. In some examples, determining the first preferred band comprises determining a frequency band and a cellular generation (e.g., 4G versus 5G).

Operation 330 (which may also be included in message 214) includes, based on at least the first traffic type, determining preference strength 158. In some examples, an emergency voice call is assigned a higher preference strength 158 than a non-emergency voice call. Operation 332, implemented using message 216, includes instructing UE 102 to use FDD over air interface 114 for data traffic session 106a. In some examples, instructing UE 102 to use FDD over air interface 114 comprises instructing UE 102 to use a first preferred band. Instructing UE 102 to use preferred duplex scheme 131 and/or preferred band 121 over air interface 114 for data traffic session 106a constitutes dynamically steering data traffic session 106a based on traffic type, because the steering is specific to the traffic type of data traffic session 106a. UE 102 uses preferred band 121 with preferred duplex scheme 131 for data traffic session 106a, in operation 334, shown as message 218.

UE 102 is then used to stream video. Operation 336 includes determining the second traffic type expected over air interface 114 for data traffic session 106b. This is streaming video type 148. In some examples, such as when UE 102 initiates a data traffic session, UE 102 determines the traffic type, as shown in operation 338 and message 220. If UE 102 initiates the data traffic session, UE 102 may identify the traffic type to BS 112, as shown in operation 340, using message 222.

Operation 342 (also indicated as message 224) includes, based on at least the second traffic type, determining a preferred duplex scheme (e.g., preferred duplex scheme 132) and a preferred band (e.g., preferred band 122). In some examples, this is a single determination. In some examples, operation 342 is performed using operations 344 and 346. Operation 344 includes, based on at least the second traffic type, determining that TDD is the preferred duplex scheme for the second data traffic session, and operation 346 includes, based on at least the second traffic type, determining the second preferred band from among the plurality of available bands (e.g., available bands 120). The determination may be split into two parts (duplex scheme and band) when multiple bands are available for the same duplex scheme, and some of those bands have preferable propagation or noise/interference characteristics. In some examples, determining the second preferred band based on at least the second traffic type comprises determining that TDD is the preferred duplex scheme for the second traffic type. In some examples, determining the second preferred band comprises determining, by BS 112, QoS flag 152 associated with the second traffic type. In some examples, determining the second preferred band comprises determining a frequency band and a cellular generation (e.g., 4G versus 5G).

Operation 348 (which may also be included in message 224) includes, based on at least the second traffic type, determining preference strength 158. In some examples, streaming video is assigned a higher preference strength 158 than streaming audio. Operation 350, implemented using message 226, includes instructing UE 102 to use TDD over air interface 114 for data traffic session 106*b*. In some examples, instructing UE 102 to use TDD over air interface 114 comprises instructing UE 102 to use a second preferred band. Instructing UE 102 to use preferred duplex scheme 131 and/or preferred band 121 over air interface 114 for data traffic session 106*b* constitutes dynamically steering data traffic session 106*b* based on traffic type, because the steering is specific to the traffic type of data traffic session 106*b*. Additionally, the steering is dynamic when the second preferred band is a different band than the first preferred band. Together, operations 332 and 350 comprise dynamically steering the first data traffic session (e.g., data traffic session 106*a*) to the first preferred band (e.g., preferred band 121) over air interface 114 and the second data traffic session (e.g., data traffic session 106*b*) to the second preferred band (e.g., preferred band 122) over air interface 114. UE 102 uses preferred band 122 with preferred duplex scheme 132 for data traffic session 106*b*, in operation 352, shown as message 228.

FIG. 4A illustrates a flowchart 400*a* of exemplary wireless communication operations associated with dynamically steering data traffic sessions based on traffic type. In some examples, at least a portion of flowchart 400*a* may be performed using one or more computing devices 500 of FIG. 5. Operation 402 includes determining that both FDD and TDD are available for an air interface between a UE and a BS. Operation 404 includes determining a first traffic type expected over the air interface for a first data traffic session. Operation 406 includes, based on at least the first traffic type, determining that FDD is a preferred duplex scheme for the first data traffic session. Operation 408 includes instructing the UE to use FDD over the air interface for the first data traffic session.

Operation 410 includes determining a second traffic type expected over the air interface for a second data traffic session. Operation 412 includes, based on at least the second traffic type, determining that TDD is a preferred duplex scheme for the second data traffic session. Operation 414 includes instructing the UE to use TDD over the air interface for the second data traffic session.

Figure 4B:
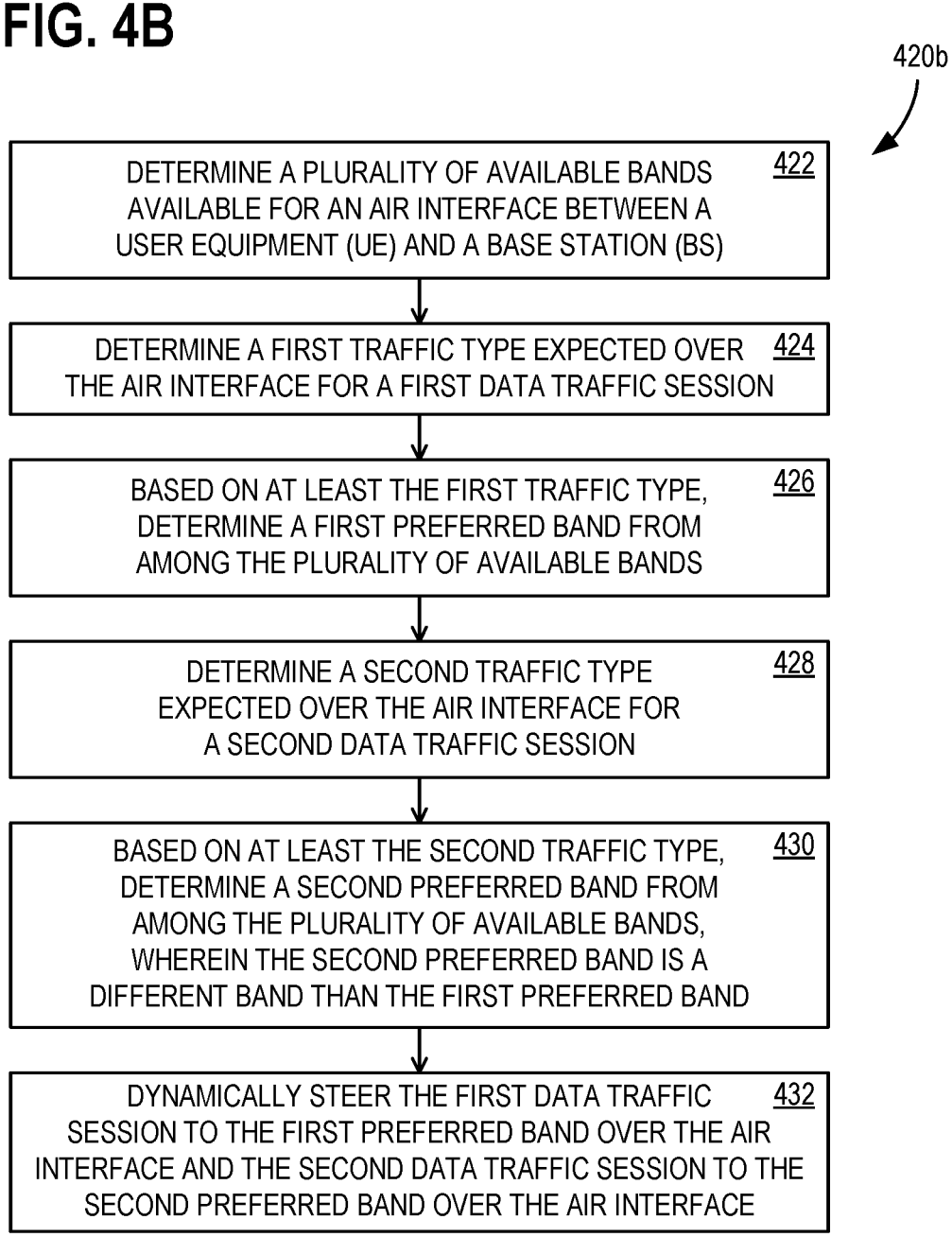
FIG. 4B illustrates another flowchart of exemplary operations associated with wireless communication using the arrangement of FIG. 1.

FIG. 4B illustrates a flowchart 400*b* of exemplary wireless communication operations associated with dynamically steering data traffic sessions based on traffic type. In some examples, at least a portion of flowchart 400*b* may be performed using one or more computing devices 500 of FIG. 5. Operation 422 includes determining a plurality of available bands available for an air interface between a UE and a BS. Operation 424 includes determining a first traffic type expected over the air interface for a first data traffic session. Operation 426 includes, based on at least the first traffic type, determining a first preferred band from among the plurality of available bands.

Operation 428 includes determining a second traffic type expected over the air interface for a second data traffic session. Operation 430 includes, based on at least the second traffic type, determining a second preferred band from among the plurality of available bands, wherein the second preferred band is a different band than the first preferred band. Operation 432 includes dynamically steering the first data traffic session to the first preferred band over the air interface and the second data traffic session to the second preferred band over the air interface.

Figure 5:
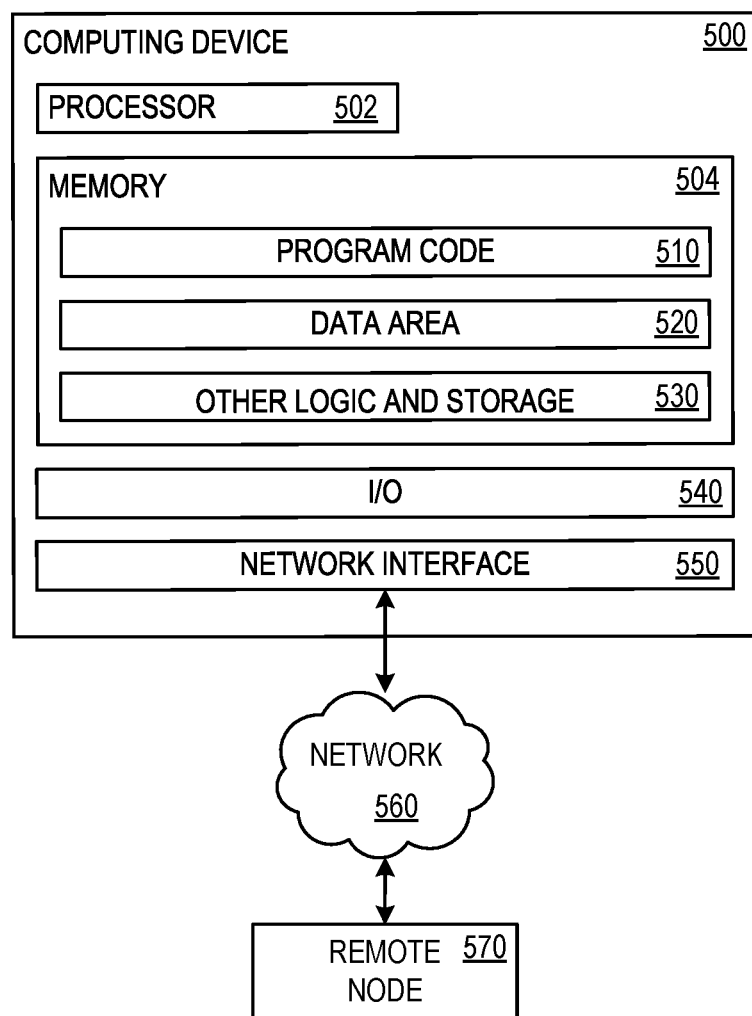
FIG. 5 illustrates a block diagram of a computing device that may be used as a component of the arrangements illustrated in FIG. 1.

FIG. 5 illustrates a block diagram of computing device 500 that may be used as a component of arrangement 100*a* of FIG. 1A and/or arrangement 100*b* of FIG. 1B, for example, as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500. For example, a remote node 570 may represent another of the above-noted nodes within arrangement 100.

ADDITIONAL EXAMPLES

An example method of wireless communication comprises: determining that both FDD and TDD are available for an air interface between a UE and a BS; determining a first traffic type expected over the air interface for a first data traffic session; based on at least the first traffic type, determining that FDD is a preferred duplex scheme for the first data traffic session; instructing the UE to use FDD over the air interface for the first data traffic session; determining a second traffic type expected over the air interface for a second data traffic session; based on at least the second traffic type, determining that TDD is a preferred duplex scheme for the second data traffic session; and instructing the UE to use TDD over the air interface for the second data traffic session.

Another example method of wireless communication comprises: determining a plurality of available bands available for an air interface between a UE and a BS; determining a first traffic type expected over the air interface for a first data traffic session; based on at least the first traffic type, determining a first preferred band from among the plurality of available bands; determining a second traffic type expected over the air interface for a second data traffic session; based on at least the second traffic type, determining a second preferred band from among the plurality of available bands, wherein the second preferred band is a different band than the first preferred band; and dynamically steering the first data traffic session to the first preferred band over the air interface and the second data traffic session to the second preferred band over the air interface.

An example system for bandwidth-dependent selection of a packet routing node comprises: a processor; and a computer-readable medium storing instructions that are operative upon execution by the processor to: determine that both FDD and TDD are available for an air interface between a UE and a BS; determine a first traffic type expected over the air interface for a first data traffic session; based on at least the first traffic type, determine that FDD is a preferred duplex scheme for the first data traffic session; instruct the UE to use FDD over the air interface for the first data traffic session; determine a second traffic type expected over the air interface for a second data traffic session; based on at least the second traffic type, determine that TDD is a preferred duplex scheme for the second data traffic session; and instruct the UE to use TDD over the air interface for the second data traffic session.

Another example system for bandwidth-dependent selection of a packet routing node comprises: a processor; and a computer-readable medium storing instructions that are operative upon execution by the processor to: determine a plurality of available bands available for an air interface between a UE and a BS; determine a first traffic type expected over the air interface for a first data traffic session; based on at least the first traffic type, determine a first preferred band from among the plurality of available bands; determine a second traffic type expected over the air interface for a second data traffic session; based on at least the second traffic type, determine a second preferred band from among the plurality of available bands, wherein the second preferred band is a different band than the first preferred band; and dynamically steer the first data traffic session to the first preferred band over the air interface and the second data traffic session to the second preferred band over the air interface.

One or more example computer storage devices have computer-executable instructions stored thereon, which, upon execution by a computer, cause the computer to perform operations comprising: determining that both FDD and TDD are available for an air interface between a UE and a BS; determining a first traffic type expected over the air interface for a first data traffic session; based on at least the first traffic type, determining that FDD is a preferred duplex scheme for the first data traffic session; instructing the UE to use FDD over the air interface for the first data traffic session; determining a second traffic type expected over the air interface for a second data traffic session; based on at least the second traffic type, determining that TDD is a preferred duplex scheme for the second data traffic session; and instructing the UE to use TDD over the air interface for the second data traffic session.

One or more example computer storage devices have computer-executable instructions stored thereon, which, upon execution by a computer, cause the computer to perform operations comprising: determining a plurality of available bands available for an air interface between a UE and a BS; determining a first traffic type expected over the air interface for a first data traffic session; based on at least the first traffic type, determining a first preferred band from among the plurality of available bands; determining a second traffic type expected over the air interface for a second data traffic session; based on at least the second traffic type, determining a second preferred band from among the plurality of available bands, wherein the second preferred band is a different band than the first preferred band; and dynamically steering the first data traffic session to the first preferred band over the air interface and the second data traffic session to the second preferred band over the air interface.

Alternatively, or in addition to the other examples described herein, examples include any combination of the following:
  instructing the UE to use FDD over the air interface comprises instructing the UE to use a first preferred band;
  instructing the UE to use TDD over the air interface comprises instructing the UE to use a second preferred band;
  the second band is a different band than the first band;
  querying, by the BS, a set of bands supported by the UE;
  determining a set of bands supported by the BS;
  determining a common set of bands supported by both the UE and the BS;
  determining the first preferred band based on at least the first traffic type comprises determining that FDD is a preferred duplex scheme for the first traffic type;
  determining the second preferred band based on at least the second traffic type comprises determining that TDD is a preferred duplex scheme for the second traffic type;
  based on at least the first traffic type, determining a preference strength;
  based on at least the second traffic type, determining a preference strength;
  an emergency voice call is assigned a higher preference strength than a non-emergency voice call;
  determining, by the UE, the first traffic type;
  identifying, by the UE, to the BS, the first traffic type;
  determining, by the UE, the second traffic type;
  identifying, by the UE, to the BS, the second traffic type;
  FDD is the preferred duplex scheme for a voice call;
  TDD is the preferred duplex scheme for a streaming video session.
  determining the preferred duplex scheme for the first data traffic session comprises determining, by the BS, a QoS flag associated with the first traffic type;
  determining the preferred duplex scheme for the second data traffic session comprises determining, by the BS, a QoS flag associated with the second traffic type;
  determining the first preferred band comprises determining, by the BS, a QoS flag associated with the first traffic type;
  determining the second preferred band comprises determining, by the BS, a QoS flag associated with the second traffic type; and
  determining the first preferred band comprises determining a frequency band and a cellular generation.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:
   determining that both frequency division duplex (FDD) and time division duplex (TDD) are available for an air interface between a user equipment (UE) and a base station (BS);
   determining a first traffic type expected over the air interface for a first data traffic session;
   based on at least the first traffic type, determining a preference strength, wherein an emergency voice call is assigned a higher preference strength than a non-emergency voice call;
   based on at least the first traffic type, determining that FDD is a preferred duplex scheme for the first data traffic session;
   instructing the UE to use FDD over the air interface for the first data traffic session;
   determining a second traffic type expected over the air interface for a second data traffic session;
   based on at least the second traffic type, determining that TDD is a preferred duplex scheme for the second data traffic session; and
   instructing the UE to use TDD over the air interface for the second data traffic session.

2. The method of claim 1,
   wherein instructing the UE to use FDD over the air interface comprises instructing the UE to use a first preferred band,
   wherein instructing the UE to use TDD over the air interface comprises instructing the UE to use a second preferred band, and
   wherein the second preferred band is a different band than the first preferred band.

3. The method of claim 1, wherein determining that both FDD and TDD are available for the air interface comprises:
   querying, by the BS, a set of bands supported by the UE;
   determining a set of bands supported by the BS; and
   determining a common set of bands supported by both the UE and the BS.

4. The method of claim 1, wherein determining the preferred duplex scheme for the second data traffic session comprises determining, by the BS, a quality of service (QoS) flag associated with the second traffic type.

5. The method of claim 1, wherein determining the first traffic type comprises:
   determining, by the UE, the first traffic type; and
   identifying, by the UE, to the BS, the first traffic type.

6. The method of claim 1, wherein FDD is the preferred duplex scheme for a voice call and TDD is the preferred duplex scheme for a streaming video session.

7. The method of claim 1,
   wherein determining the preferred duplex scheme for the first data traffic session comprises determining, by the BS, a quality of service (QoS) flag associated with the first traffic type; and
   wherein determining the preferred duplex scheme for the second data traffic session comprises determining, by the BS, a QoS flag associated with the second traffic type.

8. A system for bandwidth-dependent selection of a packet routing node, the system comprising:
   a processor; and
   a computer-readable medium storing instructions that are operative upon execution by the processor to:
      determine that both frequency division duplex (FDD) and time division duplex (TDD) are available for an air interface between a user equipment (UE) and a base station (BS);
      determine a first traffic type expected over the air interface for a first data traffic session;
      based on at least the first traffic type, determine a preference strength, wherein an emergency voice call is assigned a higher preference strength than a non-emergency voice call;
      based on at least the first traffic type, determine that FDD is a preferred duplex scheme for the first data traffic session;
      instruct the UE to use FDD over the air interface for the first data traffic session;
      determine a second traffic type expected over the air interface for a second data traffic session;
      based on at least the second traffic type, determine that TDD is a preferred duplex scheme for the second data traffic session; and
      instruct the UE to use TDD over the air interface for the second data traffic session.

9. The system of claim 8,
   wherein instructing the UE to use FDD over the air interface comprises instructing the UE to use a first preferred band,
   wherein instructing the UE to use TDD over the air interface comprises instructing the UE to use a second preferred band, and
   wherein the second preferred band is a different band than the first preferred band.

10. The system of claim 8, wherein determining that both FDD and TDD are available for the air interface comprises:
    querying, by the BS, a set of bands supported by the UE;
    determining a set of bands supported by the BS; and
    determining a common set of bands supported by both the UE and the BS.

11. The system of claim 8, wherein determining the preferred duplex scheme for the second data traffic session comprises determining, by the BS, a quality of service (QoS) flag associated with the second traffic type.

12. The system of claim 8, wherein determining the first traffic type comprises:
    determining, by the UE, the first traffic type; and
    identifying, by the UE, to the BS, the first traffic type.

13. The system of claim 8, wherein FDD is the preferred duplex scheme for a voice call and TDD is the preferred duplex scheme for a streaming video session.

14. The system of claim 8,
    wherein determining the preferred duplex scheme for the first data traffic session comprises determining, by the BS, a quality of service (QoS) flag associated with the first traffic type; and
    wherein determining the preferred duplex scheme for the second data traffic session comprises determining, by the BS, a QoS flag associated with the second traffic type.

15. One or more computer storage devices having computer-executable instructions stored thereon, which, upon execution by a computer, cause the computer to perform operations comprising:
- determining that both frequency division duplex (FDD) and time division duplex (TDD) are available for an air interface between a user equipment (UE) and a base station (BS);
- determining a first traffic type expected over the air interface for a first data traffic session;
- based on at least the first traffic type, determining a preference strength, wherein an emergency voice call is assigned a higher preference strength than a non-emergency voice call;
- based on at least the first traffic type, determining that FDD is a preferred duplex scheme for the first data traffic session;
- instructing the UE to use FDD over the air interface for the first data traffic session;
- determining a second traffic type expected over the air interface for a second data traffic session;
- based on at least the second traffic type, determining that TDD is a preferred duplex scheme for the second data traffic session; and
- instructing the UE to use TDD over the air interface for the second data traffic session.

16. The one or more computer storage devices of claim 15,
- wherein instructing the UE to use FDD over the air interface comprises instructing the UE to use a first preferred band,
- wherein instructing the UE to use TDD over the air interface comprises instructing the UE to use a second preferred band, and
- wherein the second preferred band is a different band than the first preferred band.

17. The one or more computer storage devices of claim 15, wherein determining that both FDD and TDD are available for the air interface comprises:
- querying, by the BS, a set of bands supported by the UE;
- determining a set of bands supported by the BS; and
- determining a common set of bands supported by both the UE and the BS.

18. The one or more computer storage devices of claim 15, wherein determining the preferred duplex scheme for the second data traffic session comprises determining, by the BS, a quality of service (QoS) flag associated with the second traffic type.

19. The one or more computer storage devices of claim 15, wherein determining the first traffic type comprises:
- determining, by the UE, the first traffic type; and
- identifying, by the UE, to the BS, the first traffic type.

20. The one or more computer storage devices of claim 15, wherein FDD is the preferred duplex scheme for a voice call and TDD is the preferred duplex scheme for a streaming video session.

* * * * *